US012618809B2

(12) United States Patent
Le Duff

(10) Patent No.: US 12,618,809 B2
(45) Date of Patent: May 5, 2026

(54) PROBE POSITION ENCODING BY ULTRASOUND IMAGE CORRELATION

(71) Applicant: Evident Canada, Inc., Québec (CA)

(72) Inventor: Alain Le Duff, Quebec (CA)

(73) Assignee: Evident Canada, Inc., Québec (CA)

( * ) Notice: Subject to any disclaimer, the term of this patent is extended or adjusted under 35 U.S.C. 154(b) by 177 days.

(21) Appl. No.: 18/550,316

(22) PCT Filed: Jun. 17, 2022

(86) PCT No.: PCT/CA2022/050979
§ 371 (c)(1),
(2) Date: Sep. 13, 2023

(87) PCT Pub. No.: WO2023/272378
PCT Pub. Date: Jan. 5, 2023

(65) Prior Publication Data
US 2024/0192179 A1     Jun. 13, 2024

Related U.S. Application Data

(60) Provisional application No. 63/217,106, filed on Jun. 30, 2021.

(51) Int. Cl.
*G01N 29/26*       (2006.01)
*G01N 29/265*     (2006.01)
*G01N 29/44*       (2006.01)

(52) U.S. Cl.
CPC ........... *G01N 29/265* (2013.01); *G01N 29/44* (2013.01); *G01N 2291/023* (2013.01)

(58) Field of Classification Search
CPC ................. G01N 29/265; G01N 29/44; G01N 2291/023; G01N 29/0645; G01N 29/50;
(Continued)

(56) References Cited

U.S. PATENT DOCUMENTS 5,876,342 A       3/1999   Chen et al.
6,102,865 A  *   8/2000   Hossack ................ A61B 8/145
                                                            600/443

(Continued)

FOREIGN PATENT DOCUMENTS

WO         2008151676        12/2008
WO         WO-2021102079 A1    5/2021
WO         WO-2023272378 A1    1/2023

OTHER PUBLICATIONS

"European Application Serial No. 22831092.6, Response to Communication pursuant to Rules 161(2) and 162 EPC filed Jul. 26, 2024", 11 pgs.

(Continued)

*Primary Examiner* — Francis C Gray

(74) *Attorney, Agent, or Firm* — K&L Gates LLP

(57)                ABSTRACT

Data indicative of displacement of an acoustic probe assembly (or motion of an imaging aperture associated therewith) can be extracted from acquired acoustic echo data to perform motion tracking without requiring a separate mechanical motion sensor. As an illustrative example, a deterministic noise pattern associated with a particular probe location can be identified and motion of the noise pattern can be used to provide an estimate of probe assembly motion. Such an estimate can be used to facilitate imaging corresponding to multiple probe locations in support of acoustic non-destructive testing (NDT) such as in relation to Phased Array Ultrasound Test (PAUT).

20 Claims, 9 Drawing Sheets

(58) Field of Classification Search
CPC . G01N 2291/106; G01N 29/0654; G01D 5/48
See application file for complete search history.

(56) References Cited

U.S. PATENT DOCUMENTS

| | | | |
|---|---|---|---|
| 2003/0158483 A1 | 8/2003 | Jackson et al. | |
| 2015/0346164 A1 | 12/2015 | St-laurent et al. | |
| 2018/0120344 A1* | 5/2018 | Prater .................... | G01Q 30/02 |
| 2020/0391244 A1 | 12/2020 | Willey et al. | |
| 2021/0089817 A1 | 3/2021 | Hafenrichter et al. | |
| 2022/0252547 A1* | 8/2022 | Lepage .............. | G01S 15/8993 |
| 2022/0341885 A1* | 10/2022 | Badeau ................ | G01N 29/265 |

OTHER PUBLICATIONS

"Canadian Application Serial No. 3,224,891, Office Action mailed Feb. 5, 2025", 5 pgs.
"International Application Serial No. PCT/CA2022/050979, International Search Report mailed Sep. 13, 2022", 3 pgs.
"International Application Serial No. PCT/CA2022/050979, Written Opinion mailed Sep. 13, 2022", 4 pgs.
"European Application Serial No. 22831092.6, Extended European Search Report mailed Mar. 25, 2025", 7 pgs.
"Canadian Application Serial No. 3,224,891, Response filed Jun. 2, 2025 to Office Action mailed Feb. 5, 2025", w English Claims, 18 pgs.
"European Application Serial No. 22831092.6, Response filed Aug. 13, 2025 to Extended European Search Report mailed Mar. 25, 2025", w/ claims, 6 pgs.

* cited by examiner

PROBE POSITION ENCODING BY ULTRASOUND IMAGE CORRELATION

CLAIM OF PRIORITY

This application is a U.S. National Stage filing under 35 U.S.C. § 371 from International Application No. PCT/CA2022/050979, titled "PROBE POSITION ENCODING BY ULTRASOUND IMAGE CORRELATION" to Alain Le Duff, filed on Jun. 17, 2022, which claims the benefit of priority of U.S. Provisional Patent Application Ser. No. 63/217,106, titled "PROBE POSITION ENCODING BY ULTRASOUND IMAGE CORRELATION" to Alain Le Duff, filed on Jun. 30, 2021, the entire contents of which being incorporated herein by reference.

FIELD OF THE DISCLOSURE

This document pertains generally, but not by way of limitation, to non-destructive evaluation, and more particularly, to apparatus and techniques for providing acoustic inspection, such as using a Phase Array Ultrasound Testing (PAUT) or other array acquisition approach including performing motion tracking of a probe assembly.

BACKGROUND

Various inspection techniques can be used to image or otherwise analyze structures without damaging such structures. For example, one or more of x-ray inspection, eddy current inspection, or acoustic (e.g., ultrasonic) inspection can be used to obtain data for imaging of features on or within a test specimen. For example, acoustic imaging can be performed using an array of ultrasound transducer elements, such as to image a region of interest within a test specimen. Different imaging modes can be used to present received acoustic signals that have been scattered or reflected by structures on or within the test specimen.

SUMMARY OF THE DISCLOSURE

Data indicative of displacement of an acoustic probe assembly (or motion of an imaging aperture associated therewith) can be extracted from acquired acoustic echo data to perform motion tracking without requiring a separate mechanical motion sensor. As an illustrative example, a deterministic noise pattern associated with a particular probe location can be identified and motion of the noise pattern can be used to provide an estimate of probe assembly motion. Such an estimate can be used to facilitate imaging corresponding to multiple probe locations in support of acoustic non-destructive testing (NDT) such as in relation to Phased Array Ultrasound Test (PAUT).

In an aspect, this disclosure is directed to a computer-implemented method of estimating a displacement of a probe assembly of an ultrasound inspection system along a surface of a specimen, the computer-implemented method comprising: acquiring, at a first position of the probe assembly positioned on the surface of the specimen, a first ultrasound image: acquiring, at a second position of the probe assembly positioned on the surface of the specimen, a second ultrasound image; determining a first representation of a measure of similarity between the first ultrasound image and the second ultrasound image: and estimating, using the determined first representation of the measure of similarity, the displacement of the probe assembly between the first position of the probe assembly and the second position of the probe assembly.

In an aspect, this disclosure is directed to an ultrasound inspection system comprising: a probe assembly to be positioned on a specimen under inspection: and a processor to: acquire, at a first position of the probe assembly positioned on a surface of the specimen, a first ultrasound image: acquire, at a second position of the probe assembly positioned on the surface of the specimen, a second ultrasound image; determine a first representation of a measure of similarity between the first ultrasound image and the second ultrasound image: and estimate, using the determined first representation of the measure of similarity, a displacement of the probe assembly between the first position of the probe assembly and the second position of the probe assembly.

In an aspect, this disclosure is directed to a machine-readable medium including instructions that, when executed by at least one processor, cause a system to: acquire, at a first position of a probe assembly of an ultrasound inspection system positioned on a surface of a specimen, a first ultrasound image: acquire, at a second position of the probe assembly positioned on the surface of the specimen, a second ultrasound image: determine a first representation of a measure of similarity between the first ultrasound image and the second ultrasound image: and estimate, using the determined first representation of the measure of similarity, a displacement of the probe assembly between the first position of the probe assembly and the second position of the probe assembly.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
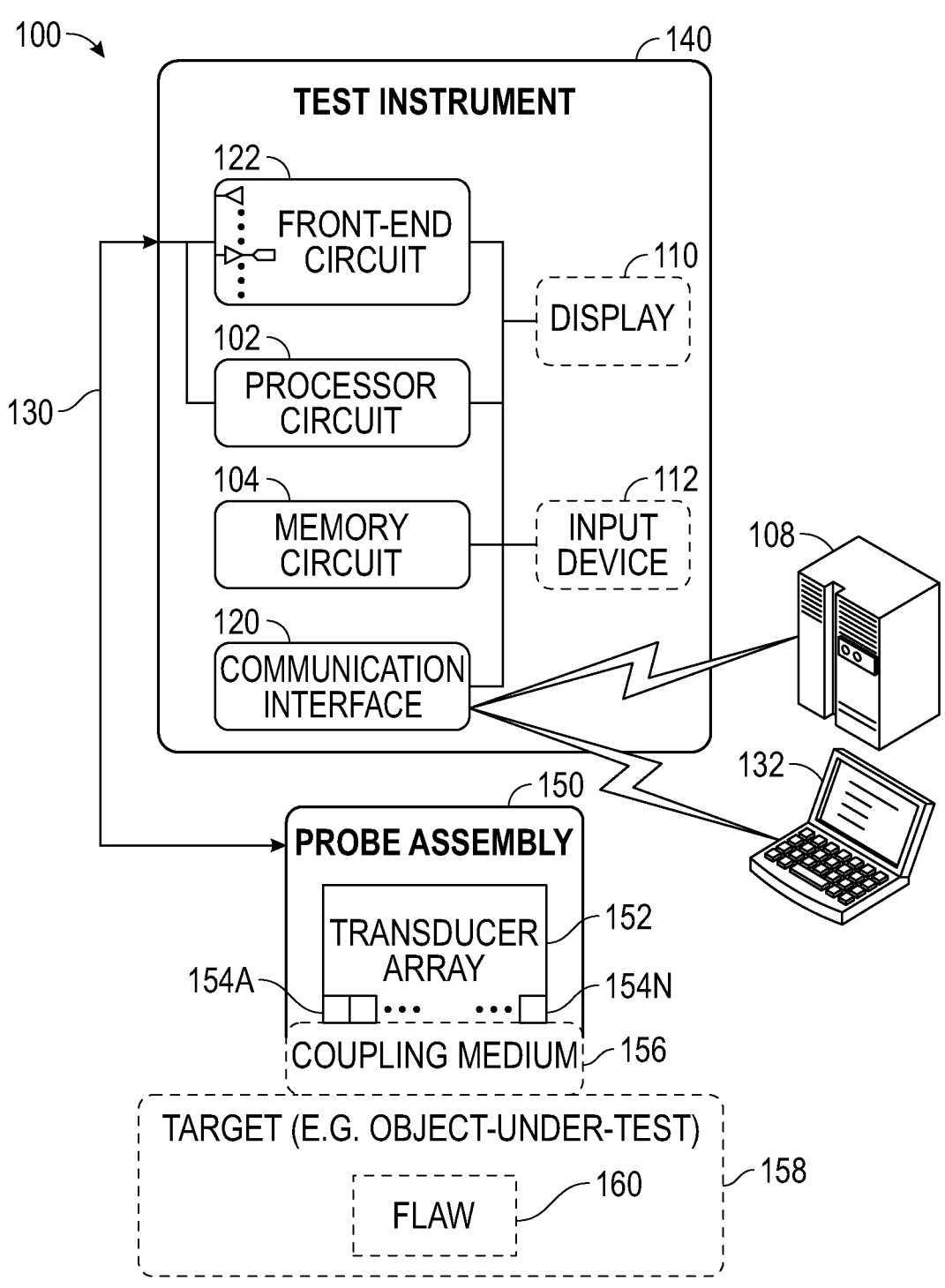
FIG. 1 illustrates generally an example of an acoustic inspection system 100, such as can be used to perform at least a portion one or more techniques as shown and described in this disclosure.

Acoustic testing, such as ultrasound-based inspection, can include focusing or beam-forming techniques to aid in construction of data plots or images representing a region of interest within the test specimen. Use of an array of ultrasound transducer elements can include use of a phased-array beamforming approach and can be referred to as Phased Array Ultrasound Testing (PAUT). For example, a delay-and-sum beamforming technique can be used such as including coherently summing time-domain representations of received acoustic signals from respective transducer elements or apertures.

In another approach, a Total Focusing Method (TFM) technique can be used where one or more elements in an array (or apertures defined by such elements) are used to transmit an acoustic pulse and other elements are used to receive scattered or reflected acoustic energy, and a matrix is constructed of time-series (e.g., A-Scan) representations corresponding to a sequence of transmit-receive cycles in which the transmissions are occurring from different elements (or corresponding apertures) in the array. Generally, imaging is performed by a probe or structure under test are moved relative to each other. For example, for applications involving acoustic inspection of composite or steel structures, a probe assembly or carriage can be moved along a surface of the structure under test.

In one approach, a mechanical encoder such as an electro-optical or electro-mechanical position encoder (e.g., a wheel or other structure) can be used to sense motion of the probe assembly relative to the object under test, such as motion indicative of translation along a specified path. Such an approach can present challenges, such as generally involving use of an entirely separate electrical loop to perform such sensing. Another challenge is that mechanical sensors or electro-optical sensors can become fouled or may require periodic calibration. Yet another challenge is that data sensed from such mechanical sensors (e.g., displacement or translation data) must generally be aligned (e.g., temporally or logically) with separately-acquired acoustic inspection data.

The present inventor has recognized, among other things, that data indicative of motion of an acoustic probe assembly (or motion of an imaging aperture associated therewith) can be extracted from acquired acoustic echo data to perform motion tracking without requiring a separate mechanical motion sensor. As an illustrative example, a deterministic noise pattern associated with a particular probe location can be identified and motion of the noise pattern can be used to provide an estimate of probe assembly motion, such as a motion of a probe assembly along a surface of a specimen. Such an estimate can be used to facilitate imaging corresponding to multiple probe locations in support of acoustic non-destructive testing (NDT) such as in relation to Phased Array Ultrasound Test (PAUT). In this disclosure, the terms "motion" and "displacement" refer to the same physical phenomena and are used interchangeably.

FIG. 1 illustrates generally an example of an acoustic inspection system 100, such as can be used to perform at least a portion one or more techniques as shown and described in this disclosure. The inspection system 100 can include a test instrument 140, such as a hand-held or portable assembly. The test instrument 140 can be electrically coupled to a probe assembly, such as using a multi-conductor interconnect 130. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with various different probe assemblies 150. Generally, the transducer array 152 includes piezoelectric transducers, such as can be acoustically coupled to a target 158 (e.g., a test specimen or "object-under-test") through a coupling medium 156. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing, or testing can be conducted with an interface between the probe assembly 150 and the target 158 otherwise immersed in a coupling medium.

The test instrument 140 can include digital and analog circuitry, such as a front-end-circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

While FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for pitch/catch inspection modes. Similarly, a test protocol can be performed using coordination between multiple test instruments 140, such as in response to an overall test scheme established from a master test instrument 140, or established by another remote system such as a compute facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit can be coupled to and controlled by one or more processor circuits, such as a processor circuit 102 included as a portion of the test instrument 140. The processor circuit can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a compute facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as A-scan matrices of time-series data or other representations of such data, for example, can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

By using various techniques of this disclosure, an acoustic inspection system, such as the acoustic inspection system 100 of FIG. 1, can be used to estimate (or "encode") a position of an acoustic probe, such as a Phased Array Ultrasonic Testing (PAUT) probe, when inspecting, for example, a metallic or composite mechanical part by non-destructive testing method. As described in more detail below, an illustrative example includes estimation of the displacement of the probe along a practical or typical scanning path along the inspected target, such as a seam, by examining a sequence of ultrasound images, e.g., B-Scan images, S-Scan images, TFM images, etc., produced during the inspection. In some examples, the scanning path along the inspected target can be an index axis, which is the axis parallel to the elements" alignment in a linear probe. An estimation of the displacement along the perpendicular axis to the normal of the part to be inspected (z-axis) can also be performed.

It should be noted that this latter z-axis displacement is generally zero in the case of a contact inspection or with a rigid wedge but may vary over time when using a water column or a flexible wedge. The water column that can be used to ensure the acoustic coupling between the probe and the specimen can vary, which results in a displacement of the probe relative to the surface of the specimen (along the z axis) which can bias the measurements and distort the ultrasound images. In the case where the coupling is ensured by a wedge or even without anything (e.g., direct coupling of the probe on the specimen) no displacement along the z axis is possible and consequently there is no need to estimate it.

Figure 2:
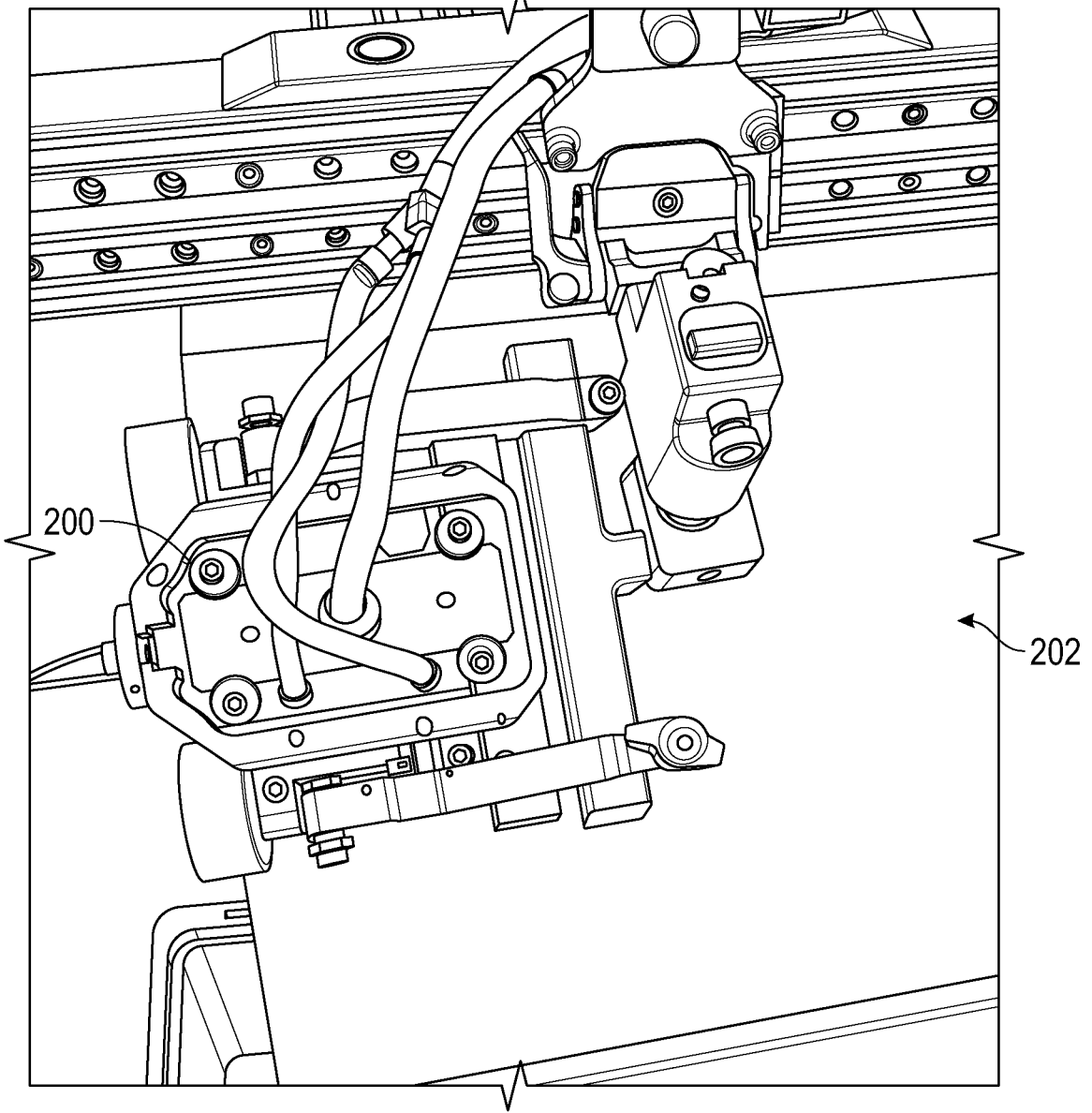
FIG. 2 is an illustration of an acoustic probe assembly of an ultrasound inspection system positioned on a surface of a specimen under test.

FIG. 2 is an illustration of an acoustic probe assembly of an ultrasound inspection system positioned on a surface of a specimen under test. In the example shown in FIG. 2, a probe assembly 200 may use a water column to inspect a specimen 202, such as a metallic specimen, e.g., a steel pipe. Various techniques of this disclosure can be used to estimate a displacement of the probe assembly 200 of an ultrasound inspection system along a surface of the specimen 202.

Figure 3:
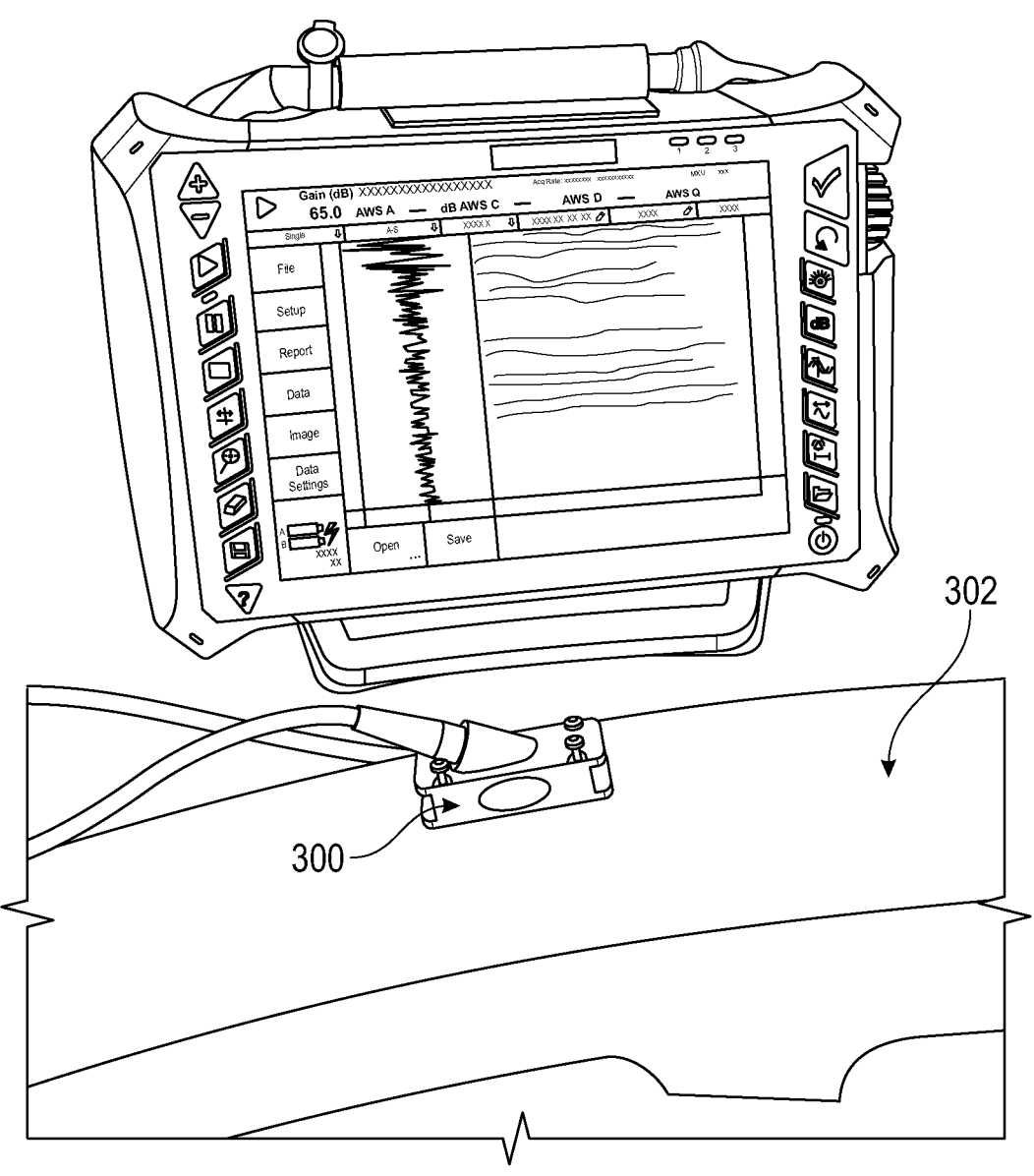
FIG. 3 is an illustration of an acoustic probe assembly of a test instrument positioned on a surface of another specimen under test.

FIG. 3 is an illustration of an acoustic probe assembly of test instrument positioned on a surface of another specimen under test. In the example shown in FIG. 3, a probe assembly 300 may include a flexible wedge to inspect a specimen 302, such as a composite material. Various techniques of this disclosure can be used to estimate a displacement of the probe assembly 300 of an ultrasound inspection system along a surface of the specimen 302.

Figure 4:
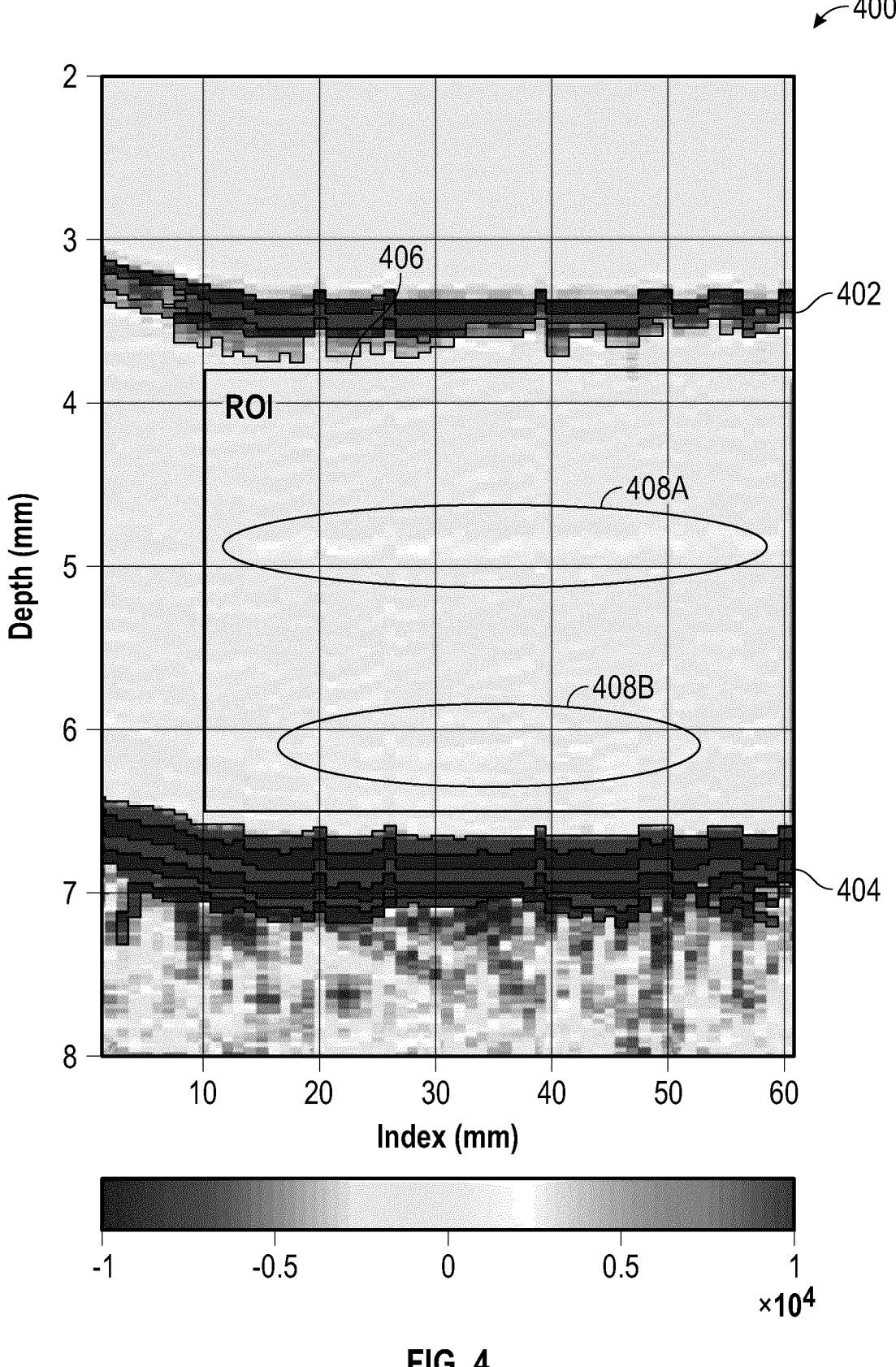
FIG. 4 depicts an experimentally-obtained ultrasound image.

FIG. 4 depicts an experimentally-obtained ultrasound image. The ultrasound image 400 is an example of a B-scan image acquired with a column water. The ultrasound image 400 includes a front wall portion 402 and back wall portion 404, acquired using a linear probe with 64 elements and a central frequency equal to 7.5 MHz. The front wall portion 402 and the back wall portion 404 provide an indication of thickness of the specimen.

Figure 5B:
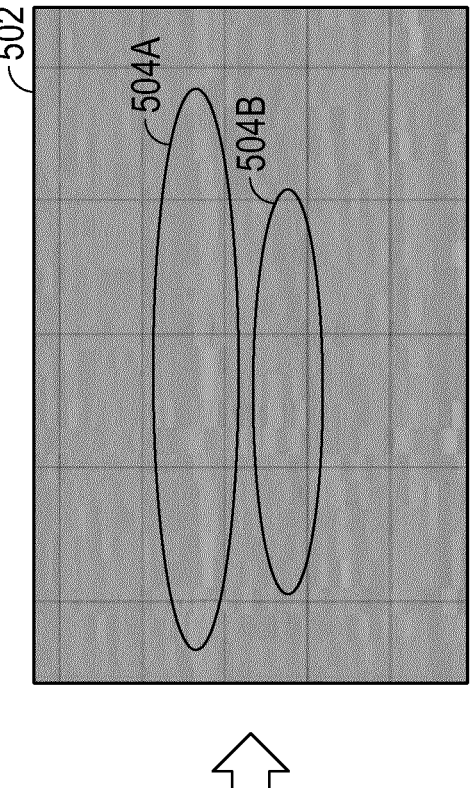
FIG. 5B is an ultrasound image corresponding to the microscopy image in FIG. 5A.
Figure 5A:
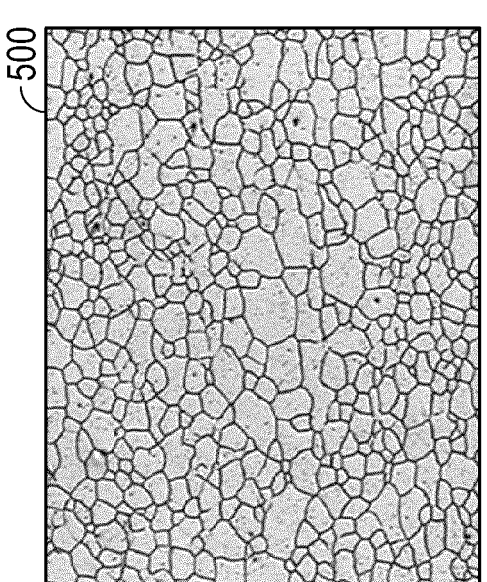
FIG. 5A is a microscopy image of a specimen.

Generally, a region of interest (ROI) 406 corresponding to a section of the inspected area below the probe is defined. The corresponding images show a structural noise, chaotic but deterministic in nature, which can correspond to deterministic speckle noise (see, e.g., FIGS. 5A and 5B illustrating that a particular grain configuration provides a scattering profile corresponding to the ultrasound image). Examples of the structural noise are shown generally at 408A, 408B in FIG. 4. Using various techniques of this disclosure, an ultrasound inspection system, such as the acoustic inspection system 100 of FIG. 1, can estimate a displacement of a probe assembly because the structural deterministic noise, which is a characteristic of the material, moves in the same manner. In other words, a pattern in the ultrasound image that is formed by the structural noise 408A, 408B in FIG. 4, for example, moves by an amount $\Delta x$ when the probe assembly moves by the same amount $\Delta x$. Moreover, defect indications (cracks, for example) can appear in the image, but do not affect (e.g., inhibit) the motion estimation.

FIG. 5A is a microscopy image of a specimen. In particular, the image 500 of FIG. 5A depicts grains in steel at 100× magnification.

FIG. 5B is an ultrasound image corresponding to the microscopy image in FIG. 5A. In particular, the image 502 of FIG. 5B is a B-scan image, that corresponds to the image 500 in FIG. 5A. The image 502 includes a scattering profile that is representative of the material in the specimen. Examples of structural noise are shown generally at 504A, 504B in FIG. 5B.

Figure 6:
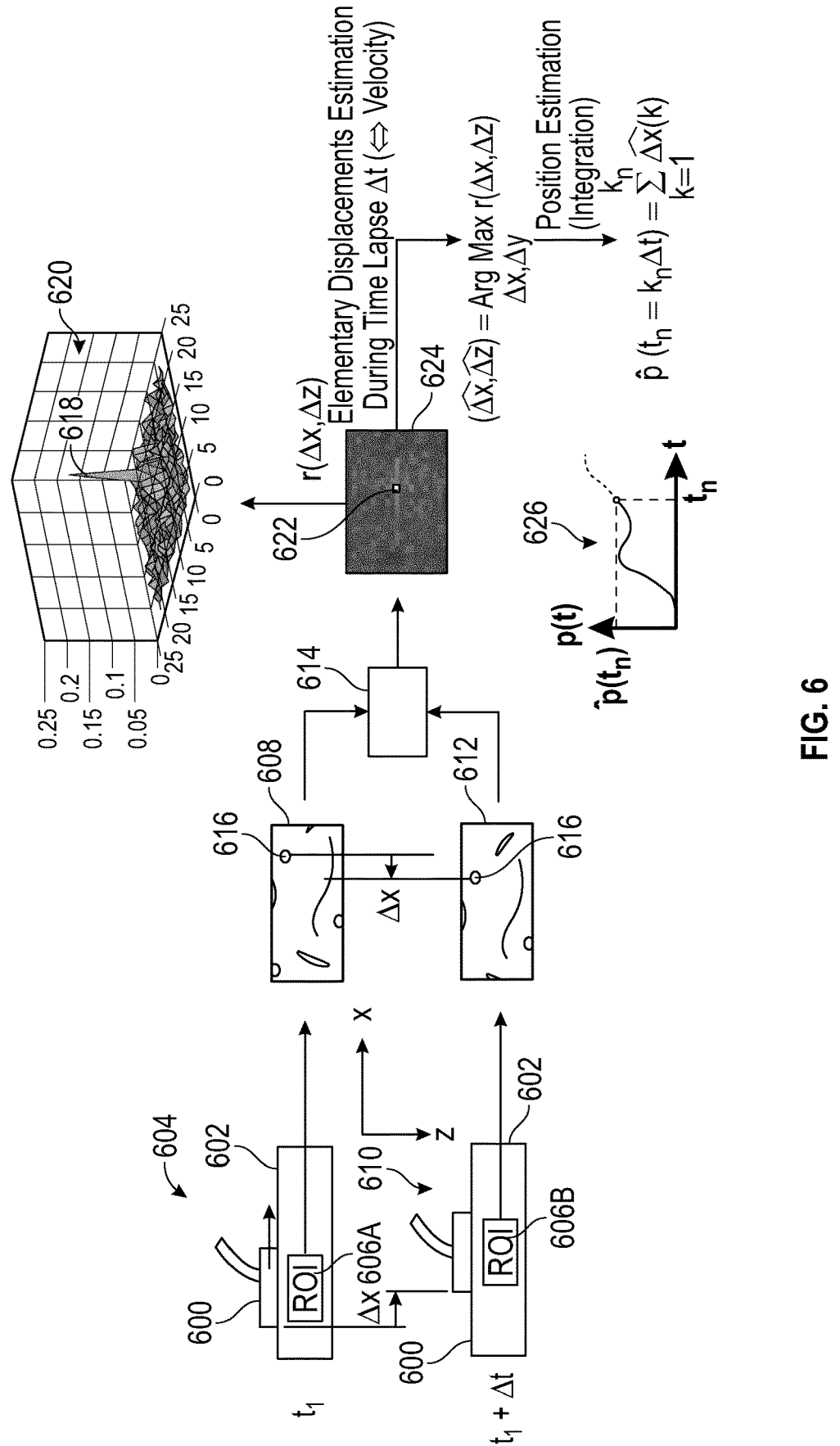
FIG. 6 is a conceptual diagram illustrating an example of a method of estimating a displacement of a probe assembly of an ultrasound inspection system.
Figure 8:
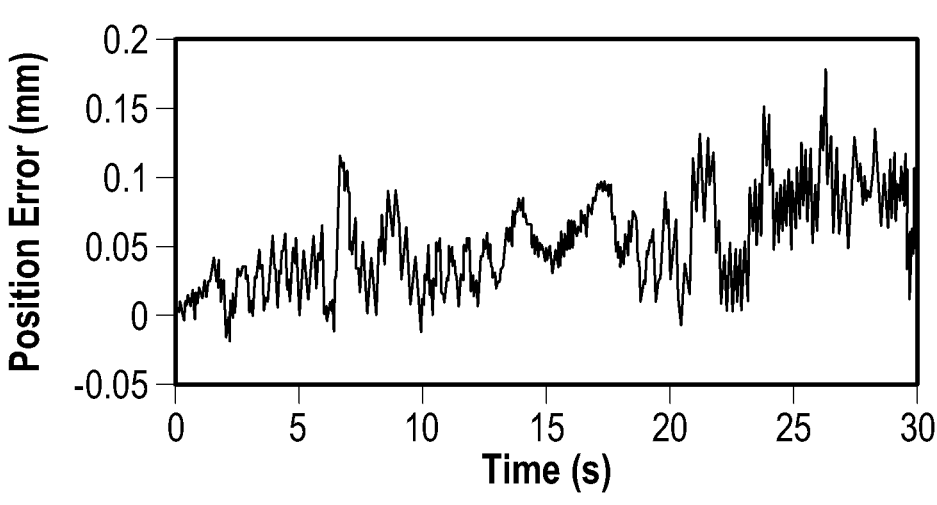
FIG. 8 is a graph depicting the error in the position of the probe assembly over time.

FIG. 6 is a conceptual diagram illustrating an example of a method of estimating a displacement of a probe assembly of an ultrasound inspection system. A probe assembly 600 of an ultrasound inspection system, e.g., the acoustic inspection system 100 of FIG. 1, is positioned on a specimen 602, e.g., a metallic or composite material under inspection. A probe assembly 600 having a linear array can be used to acquire two-dimensional ultrasound images. An example of a linear array is shown at FIG. 8 in U.S. patent application Ser. No. 17/650,095, which is incorporated herein by reference in its entirety.

A first position of the probe assembly 600 at time $t_1$ is shown at 604. Under the probe assembly 600 at time $t_1$ is an ROI 606A, such as the ROI 406 of FIG. 4. An ultrasound inspection system, such as the acoustic inspection system 100 of FIG. 1, can acquire, at the first position of the probe assembly (at time $t_1$) positioned on the surface of the specimen, a first ultrasound image 608, such as a B-scan image, an S-scan image, a TFM image, and the like.

A second position of the probe assembly 600 at time $t_1+\Delta t$ is shown at 610. Under the probe assembly 600 at time $t_1+\Delta t$ is an ROI 606B. During the time $\Delta t$, the probe assembly 600 moved by a displacement of $\Delta x$. The ultrasound inspection system can acquire, at the second position of the probe assembly (at time $t_1+\Delta t$) positioned on the surface of the specimen, a second ultrasound image 612, such as a B-scan image, TFM image, and the like.

By using various techniques of this disclosure, a comparison between the first ultrasound image 608, as a reference, and the successive ultrasound images, such as the second ultrasound image 612, as well as the knowledge of the geometrical characteristics of the probe assembly (pitch on the x-axis) and the sampling frequency of the ultrasonic signals (z-axis), allow the elementary displacements of the probe assembly to be estimated during a time interval as short as between two successive image acquisitions. For example, a summation of these elementary displacement estimates, achieved by integration, permits recovery, as a function of time, of an estimation of a displacement value or vector of the probe assembly throughout the inspection. This information can then be transmitted to an instrument to associate the image sequence viewed by an operator with a particular position on the structure under inspection.

A processor 614, such as the processor circuit 102 of FIG. 1, can evaluate comparisons between ultrasound images using a two-dimensional spatial cross-correlation method, such as shown illustratively in FIG. 6 (illustrating the estimation of the displacement along the x-axis, where z-axis displacement is null in this example). As an example, the processor 614 can receive the acquired first ultrasound image 608 and second ultrasound image 612 and determine a first representation of a measure of similarity, as a function of displacement along x-axis and z-axis, between the first ultrasound image 608 and the second ultrasound image 612. That is, the processor 614 can use the structural noise 616 present in the images to determine a displacement of the probe assembly.

For example, the processor 614 can determine a first representation of a measure of similarity between the first ultrasound image 608 and the second ultrasound image 612 by performing a first cross-correlation of the first ultrasound image 608 and the second ultrasound image 612. In addition to cross-correlation, other examples of measures of similarity that can be used include photogrammetry and the Fourier transform. The first cross-correlation is shown graphically in FIG. 6 as a peak 618 in an x, z plane 620. The first cross-correlation is also shown graphically in FIG. 6 as a dot 622 in a graphic 624, such as a clear dot or colored dot, e.g., yellow dot.

In a 3D viewing, the cross-correlation result takes the form of a surface where a peak appears and gives an indication of both the displacement and the degree of similarity between the two images. Although this peak (and the entire cross-correlation image) is not visible in the instrument, it is used as an input by the algorithm to estimate $\Delta x$, $\Delta z$ (the displacement) and the degree of similarity (also called the correlation coefficient). As such, "peak" means the maximum value of the cross-correlation.

As seen in FIG. 6, an estimated position ($\widehat{\Delta x}, \widehat{\Delta z}$) of the probe assembly 600 corresponds to a position of the maximum value of the representation of the measure of similarity, such as a cross-correlation, which can be determined by the argument of the maxima, e.g., arg max $r(\Delta x, \Delta z)$. When the displacement is zero, the images are practically identical (except for noise) and the correlation coefficient (peak amplitude) is very close to 1 (very high similarity). As the displacement increases, the two images become less and less identical and the correlation coefficient decreases accordingly. When the value of the displacement becomes greater than the size of the images, no correspondence is possible, and the correlation coefficient becomes very close to 0.

In this manner, the processor 614 can estimate the elementary displacements of the probe assembly during a time interval between successive image acquisitions. A summation of these elementary displacements, $t_n$ achieved by integration, permits recovery, as a function of time, of a displacement value or vector of the probe assembly throughout the inspection, such as $$\hat{p}(t_n = k_n \Delta t) = \sum_{k=1}^{k_n} \widehat{\Delta x}(k),$$

where $\hat{p}$ represents the estimate position of the probe assembly. A graphical illustration showing the estimated position $\hat{p}(t)$ of the probe assembly is shown at 626.

In this manner, the processor 614 can determine, in relation to an initial position (corresponding to a reference image) of the probe assembly, a new second position of the probe assembly that corresponds to a maximum value of the representation of the measure of similarity. For example, the processor 614 can determine, in relation to the first position 604 of the probe assembly 600, the second position 610 of the probe assembly 600 that corresponds to a maximum value of the representation of the measure of similarity, such as a first cross-correlation, where the first cross-correlation is a comparison between an ultrasound image at the first position of the probe assembly (a reference image) and an ultrasound image at the second position of the probe assembly. The processor can determine a current position of the probe assembly using two images: the reference image corresponding to the initial position and the current image acquired for a new position of the probe.

Subsequent positions can be found similarly. For example, the ultrasound imaging system can acquire, at a third position of the probe assembly positioned on the surface of the specimen, a third ultrasound image and the processor 614 can perform a second cross-correlation of the first ultrasound image and the third ultrasound image. The processor 614 can then estimate, using the determined second cross-correlation, the displacement of the probe assembly between the first position of the probe assembly and the third position of the probe assembly. For example, the processor 614 can determine, in relation to the first position 604 of the probe assembly, the third position of the probe assembly that corresponds to a maximum value of the second cross-correlation, where the second cross-correlation is a comparison between an ultrasound image at the first position of the probe assembly (the reference image) and the ultrasound image at the third position of the probe assembly.

The techniques are described below with respect to the flow diagram of FIG. 11.

Figure 7:
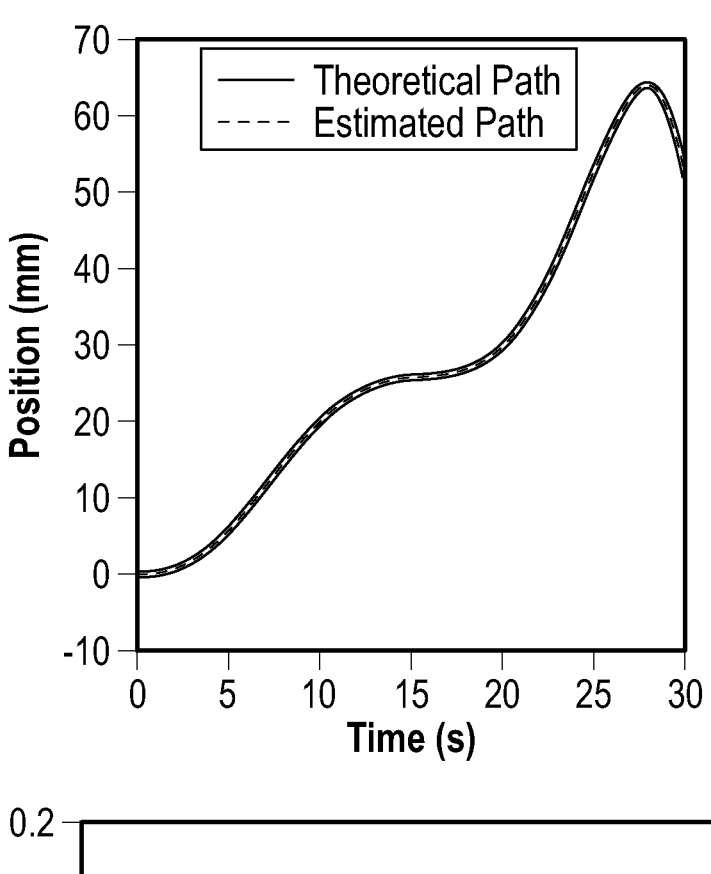
FIG. 7 depicts a theoretical position of the probe assembly and an estimated position of the probe assembly determined using the techniques of this disclosure.

FIG. 7 depicts a theoretical position of the probe assembly and an estimated position of the probe assembly determined using the techniques of this disclosure. The x-axis depicts time in seconds and the y-axis depicts a position of the probe in millimeters. As seen in FIG. 7, the estimated position closely tracks the theoretical position.

FIG. 8 is a graph depicting the error in the position of the probe assembly over time. The x-axis depicts time in seconds and the y-axis depicts a position error of the probe in millimeters. As seen in FIG. 8, the error gradually increases over time.

Figure 9:
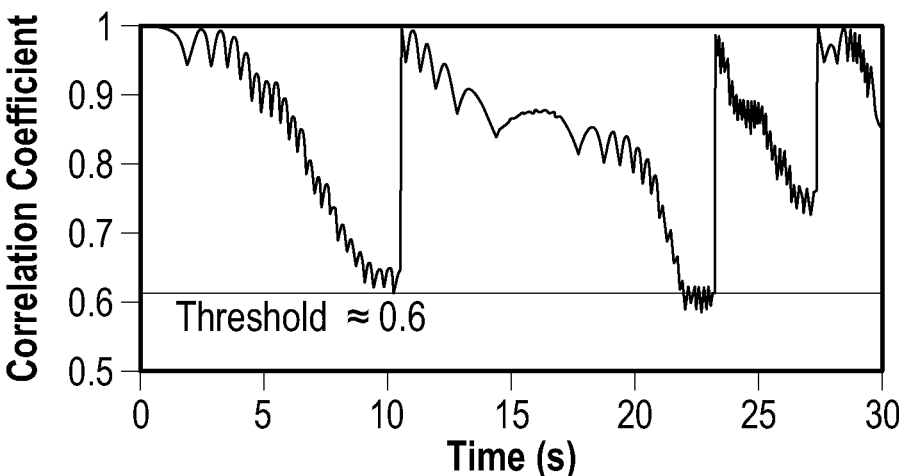
FIG. 9 is a graph depicting a correlation coefficient for corresponding probe position estimates.

To address the position error depicted in FIG. 6, the processor 614 of FIG. 6 can assess a validity of the estimated displacement, such as by determining the correlation coefficient value for respective probe position estimates, as seen in FIG. 9.

FIG. 9 is a graph depicting a correlation coefficient for corresponding probe position estimates. The x-axis depicts time in seconds and the y-axis depicts a magnitude of the correlation coefficient.

Below a specified threshold, a relevance of the correlation may no longer be guaranteed. In such a case, a current image can be used as the new reference image when the correlation is at or below the specified threshold. This "reset" approach helps to suppress or inhibit the displacement estimate from strong drifting over time during the integration phase.

In this manner, the processor 614 can determine a correlation coefficient, and select a second reference image when the determined correlation coefficient meets a threshold value. By way of non-limiting example, FIG. 9 depicts a threshold value of about 0.6 for the correlation coefficient. Once the correlation coefficient meets that threshold value, a new reference image is used and, as seen in FIG. 9, the correlation coefficient jumps back to 1. As an example, the processor 614 can select a current, e.g., most recently acquired, ultrasound image as the new reference image when the determined correlation coefficient meets the threshold value.

Apparatus or techniques as described in this disclosure can be substituted for mechanical encoders (such as replacing a mechanical encoding wheel for example). Use of the apparatus or techniques described herein can simplify the mechanical device (scanner, for example). In particular, the present subject matter avoids position tracking errors related to any loss of adhesion of an encoding wheel or other mechanical faults. Data fusion can also be considered with orientation and position estimation devices based on the use of an Inertial Measurement Unit (IMU), for example. Accordingly, the subject matter herein does not preclude use of accelerometers or mechanical sensors and may be used to supplement or enhance results obtained from such sensors.

Figure 10:
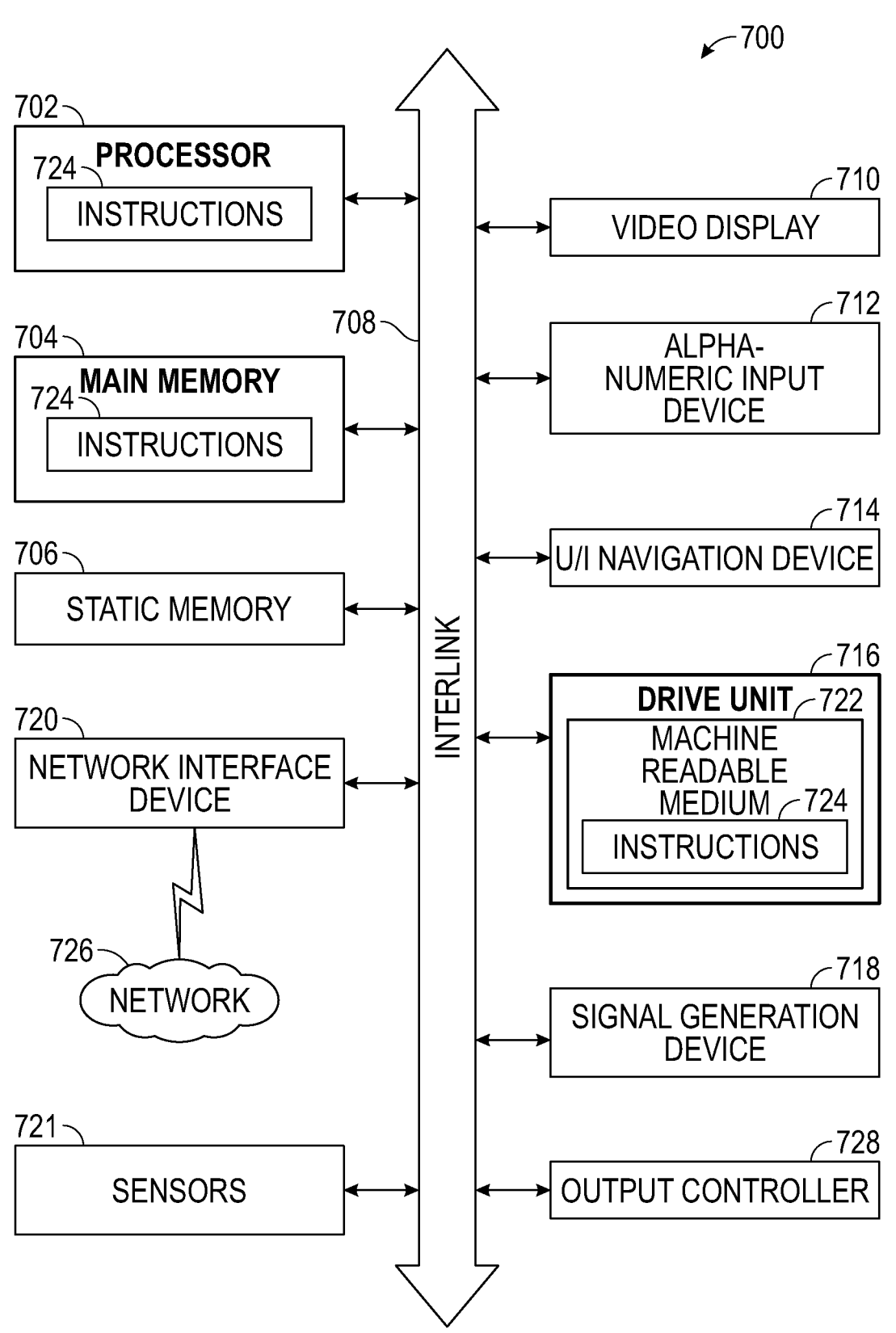
FIG. 10 illustrates a block diagram of an example comprising a machine 700 upon which any one or more of the techniques (e.g., methodologies) discussed herein may be performed.

FIG. 10 illustrates a block diagram of an example comprising a machine 700 upon which any one or more of the techniques (e.g., methodologies) discussed herein may be performed. In various examples, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 730. The machine 700 may further include a display unit 710, an alphanumeric input device 712 (e.g., a key board), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 708 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

The term "machine-readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices: magnetic or other phase-change or state-change memory circuits: magnetic disks, such as internal hard disks and removable disks: magneto-optical disks: and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks such as conforming to one or more standards such as a 4G standard or Long Term Evolution (LTE)), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others). In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Figure 11:
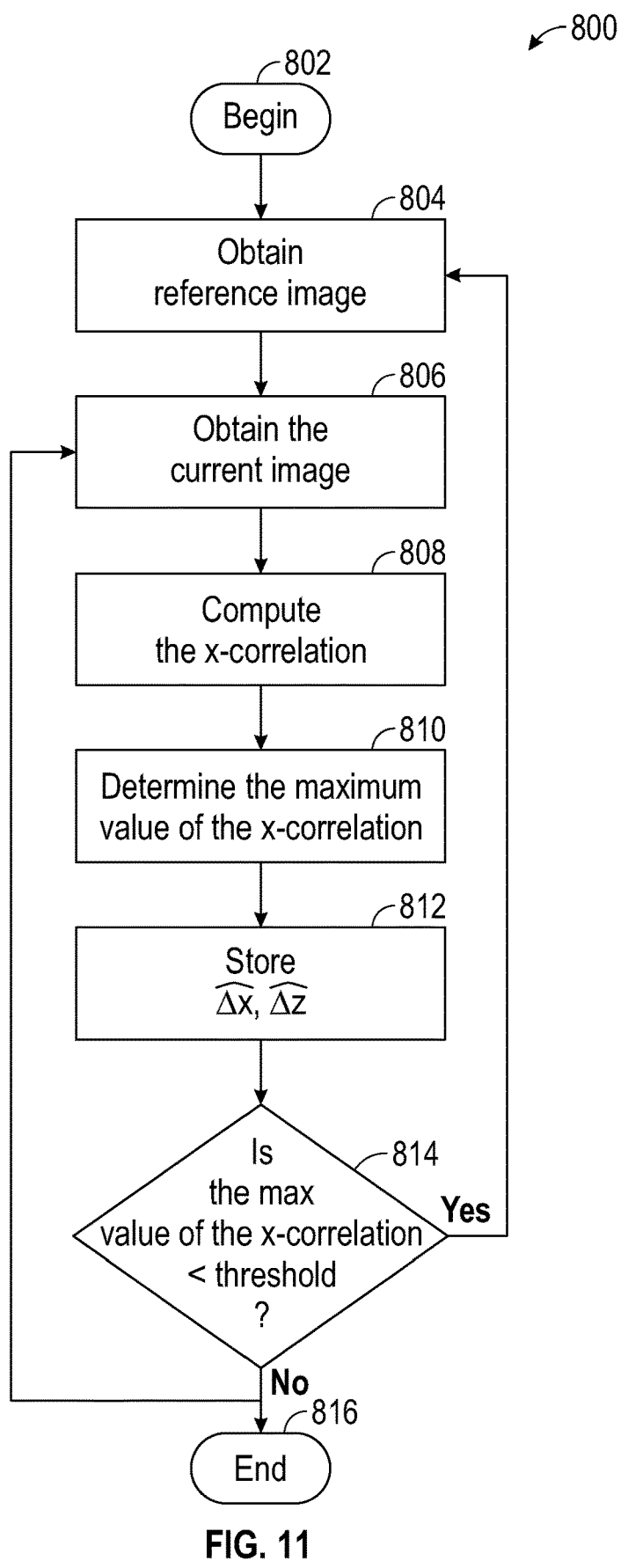
FIG. 11 is a flow diagram of an example of a method of implementing various techniques of this disclosure.

FIG. 11 is a flow diagram of an example of a method of implementing various techniques of this disclosure. The method 800 begins at block 802 and, at block 804, the processor 614 of FIG. 6 can obtain a reference image, such as the first ultrasound image 608 of FIG. 6.

At block 806, the processor 614 can obtain a current image, such as the second ultrasound image 612 of FIG. 6.

At block 808, the processor 614 can compute the cross-correlation ("X-correlation" in FIG. 11) between the reference image and the current image.

At block 810, the processor 614 can determine the maximum value of the cross-correlation computed at block 808.

At block 812, the processor 614 can store an estimated position ($\widehat{\Delta x}, \widehat{\Delta z}$) of the probe assembly 600 of FIG. 6, which corresponds to a position of the maximum value of the cross-correlation (a representation of the measure of similarity), which can be determined by the argument of the maxima, e.g., arg max r($\Delta x$, $\Delta z$).

At block 814, the processor 614 can determine if the maximum value of the cross-correlation is less than a threshold. If the maximum value of the cross-correlation is less than the threshold ("YES" branch of block 814) than the processor can obtain a new reference image at block 804. If the maximum value of the cross-correlation is not less than the threshold ("NO" branch of block 814) than the processor can obtain the current image at block 806, e.g., after the probe assembly 600 of FIG. 6 has moved to a new position. The processor 614 can then compute a new cross-correlation between the reference image and the current image to determine a second cross-correlation, and the process can continue.

In this manner, the processor 614 can compute a first cross-correlation between the reference image (1st position) and a second image (second position), find a maximum value, and store the estimated position, then compute a second cross-correlation between the reference image (1st position) and a third image (third position), and so forth.

After completion, the method can end at block 816.

Various Notes

Each of the non-limiting aspects described herein can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the claims, the terms "including" and "comprising" are open-ended, that is, a system, device, article, composition, formulation, or process that includes elements in addition to those listed after such a term in a claim are still deemed to fall within the scope of that claim. Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

The claimed invention is:

1. A computer-implemented method of estimating a displacement of a probe assembly of an ultrasound inspection system along a surface of a specimen, the computer-implemented method comprising:

acquiring, at a first position of the probe assembly positioned on the surface of the specimen, a first ultrasound image, wherein the first ultrasound image includes first structural noise of material grains in the specimen;

acquiring, at a second position of the probe assembly positioned on the surface of the specimen, a second ultrasound image, wherein the second ultrasound image includes second structural noise of the material grains in the specimen;

determining, using the first structural noise and the second structural noise, a first representation of a measure of similarity between the first ultrasound image and the second ultrasound image; and estimating, using the determined first representation of the measure of similarity, the displacement of the probe assembly between the first position of the probe assembly and the second position of the probe assembly.

2. The computer-implemented method of claim 1, wherein the first ultrasound image and the second ultrasound image include B-scan images.

3. The computer-implemented method of claim 1, wherein determining the first representation of the measure of similarity between the first ultrasound image and the second ultrasound image includes:

performing a first cross-correlation between the first ultrasound image and the second ultrasound image.

4. The computer-implemented method of claim 3, comprising:

acquiring, at a third position of the probe assembly positioned on the surface of the specimen, a third ultrasound image;

performing a second cross-correlation of the first ultrasound image and the third ultrasound image; and estimating, using the determined second cross-correlation, the displacement of the probe assembly between the first position of the probe assembly and the third position of the probe assembly.

5. The computer-implemented method of claim 4, wherein the first ultrasound image is a first reference image, the computer-implemented method comprising:

determining a correlation coefficient; and selecting a second reference image when the determined correlation coefficient meets a threshold value.

6. The computer-implemented method of claim 5, wherein selecting the second reference image when the determined correlation coefficient meets the threshold value includes:

selecting a current ultrasound image as a new reference image when the determined correlation coefficient meets the threshold value.

7. The computer-implemented method of claim 4, wherein estimating, using the determined first representation of the measure of similarity, the displacement of the probe assembly between the first position of the probe assembly and the second position of the probe assembly includes:

determining, in relation to the first position of the probe assembly, the second position of the probe assembly that corresponds to a maximum value of the first cross-correlation; and determining, in relation to the first position of the probe assembly, a third position of the probe assembly that corresponds to a maximum value of the second cross-correlation.

8. An ultrasound inspection system comprising:

a probe assembly to be positioned on a specimen under inspection; and a processor to:

acquire, at a first position of the probe assembly positioned on a surface of the specimen, a first ultrasound image, wherein the first ultrasound image includes first structural noise of material grains in the specimen;

acquire, at a second position of the probe assembly positioned on the surface of the specimen, a second ultrasound image, wherein the second ultrasound image includes second structural noise of the material grains in the specimen;

determine, using the first structural noise and the second structural noise, a first representation of a measure of similarity between the first ultrasound image and the second ultrasound image; and estimate, using the determined first representation of the measure of similarity, a displacement of the probe assembly between the first position of the probe assembly and the second position of the probe assembly.

9. The ultrasound inspection system of claim 8, wherein the probe assembly includes a linear array.

10. The ultrasound inspection system of claim 8, wherein the first ultrasound image and the second ultrasound image include B-scan images.

11. The ultrasound inspection system of claim 8, wherein the processor configured to determine the first representation of the measure of similarity between the first ultrasound image and the second ultrasound image is configured to:

perform a first cross-correlation between the first ultrasound image and the second ultrasound image.

12. The ultrasound inspection system of claim 11, wherein the processor further configured to:

acquire, at a third position of the probe assembly positioned on the surface of the specimen, a third ultrasound image;

perform a second cross-correlation of the first ultrasound image and the third ultrasound image; and

estimate, using the determined second cross-correlation, the displacement of the probe assembly between the first position of the probe assembly and the third position of the probe assembly.

13. The ultrasound inspection system of claim 12, wherein the first ultrasound image is a first reference image, the processor further configured to:

determine a correlation coefficient; and select a second reference image when the determined correlation coefficient meets a threshold value.

14. The ultrasound inspection system of claim 13, wherein the processor configured to select the second reference image when the determined correlation coefficient meets the threshold value is configured to:

select a current ultrasound image as a new reference image when the determined correlation coefficient meets the threshold value.

15. The ultrasound inspection system of claim 12, wherein the processor configured to estimate, using the determined first representation of the measure of similarity, the displacement of the probe assembly between the first position of the probe assembly and the second position of the probe assembly is configured to:

determine, in relation to the first position of the probe assembly, the second position of the probe assembly that corresponds to a maximum value of the first cross-correlation; and determine, in relation to the first position of the probe assembly, a third position of the probe assembly that corresponds to a maximum value of the second cross-correlation.

16. A machine-readable medium including instructions that, when executed by at least one processor, cause a system to:

acquire, at a first position of a probe assembly of an ultrasound inspection system positioned on a surface of a specimen, a first ultrasound image, wherein the first ultrasound image includes first structural noise of material grains in the specimen;

acquire, at a second position of the probe assembly positioned on the surface of the specimen, a second ultrasound image, wherein the second ultrasound image includes second structural noise of material grains in the specimen;

determine, using the first structural noise and the second structural noise, a first representation of a measure of similarity between the first ultrasound image and the second ultrasound image; and estimate, using the determined first representation of the measure of similarity, a displacement of the probe assembly between the first position of the probe assembly and the second position of the probe assembly.

17. The machine-readable medium of claim 16, wherein the first ultrasound image and the second ultrasound image include B-scan images.

18. The machine-readable medium of claim 16, wherein the instructions that cause the system to determine the first representation of the measure of similarity between the first ultrasound image and the second ultrasound image cause the system to:

perform a first cross-correlation between the first ultrasound image and the second ultrasound image.

19. The machine-readable medium of claim 16, wherein the first ultrasound image is a first reference image, including further instructions that cause the system to:

determine a correlation coefficient; and select a second reference image when the determined correlation coefficient meets a threshold value.

20. The machine-readable medium of claim 19, wherein the instructions that cause the system to select the second reference image when the determined correlation coefficient meets the threshold value cause the system to:

select a current ultrasound image as a new reference image when the determined correlation coefficient meets the threshold value.

* * * * *